US012567782B2

(12) United States Patent
Kim

(10) Patent No.: US 12,567,782 B2
(45) Date of Patent: Mar. 3, 2026

(54) DRIVE MOTOR PROVIDED WITH BLDC MOTOR AND SWIVEL ACTUATOR USING SAME

(71) Applicant: AMOTECH CO., LTD., Incheon (KR)

(72) Inventor: Byung Soo Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 436 days.

(21) Appl. No.: 18/265,415

(22) PCT Filed: Dec. 23, 2021

(86) PCT No.: PCT/KR2021/019737
§ 371 (c)(1),
(2) Date: Jun. 5, 2023

(87) PCT Pub. No.: WO2022/139509
PCT Pub. Date: Jun. 30, 2022

(65) Prior Publication Data
US 2023/0369939 A1 Nov. 16, 2023

(30) Foreign Application Priority Data

Dec. 24, 2020 (KR) ........................ 10-2020-0183722

(51) Int. Cl.
*H02K 7/116* (2006.01)
*H02K 7/08* (2006.01)
*H02K 11/215* (2016.01)

(52) U.S. Cl.
CPC ........... *H02K 7/1166* (2013.01); *H02K 7/083* (2013.01); *H02K 11/215* (2016.01)

(58) Field of Classification Search
None
See application file for complete search history.

(56) References Cited

U.S. PATENT DOCUMENTS

2002/0162413 A1* 11/2002 Nagai ........................ F16H 1/20
74/423
2013/0109526 A1* 5/2013 Oishi ................... H02K 7/1166
475/149
(Continued)

FOREIGN PATENT DOCUMENTS

KR 101323777 10/2013
KR 20160041009 4/2016
(Continued)

OTHER PUBLICATIONS

International Search Report—PCT/KR2021/019737 dated Apr. 4, 2022.

*Primary Examiner* — Bernard Rojas
(74) *Attorney, Agent, or Firm* — CANTOR COLBURN LLP

(57) ABSTRACT

Provided is a drive motor having a slim BLDC motor vertically mounted in a housing and a swivel actuator using same. A swivel actuator includes: a cylindrical housing where a hollow cylindrical portion protrudes from a bottom of a center thereof and first and second step portions protrude from an inner side wall thereof; a drive motor arranged on the bottom surface of the housing and providing rotational power to a rotor support extending upward; a cylindrical first worm gear integrally formed on the outer circumference of the rotor support; and first and second three-stage gear mechanisms coupled to opposite outer circumferences of the first worm gear, and rotating a rotating table with increased torque by reducing a rotation speed of the first worm gear.

10 Claims, 9 Drawing Sheets

200

(56)        References Cited

U.S. PATENT DOCUMENTS

2016/0238106 A1*   8/2016   Park ..................... F16H 57/028
2022/0348114 A1*  11/2022   Lee ................... B60N 2/02246
2024/0154494 A1*   5/2024   Kim ...................... H02K 7/003

FOREIGN PATENT DOCUMENTS

KR         20170050869        5/2017
KR         20180014304        2/2018
KR           101920041       11/2018
KR           102002727        7/2019

* cited by examiner

DRIVE MOTOR PROVIDED WITH BLDC MOTOR AND SWIVEL ACTUATOR USING SAME

TECHNICAL FIELD

The present invention relates to an actuator, and more particularly, to a drive motor provided with a slim brushless direct-current (BLDC) motor vertically mounted in a housing, and a swivel actuator using the drive motor.

BACKGROUND ART

An electric actuator rotates or linearly moves a table (or a passive object) to be driven with a high torque rotating force obtained by torque conversion of the rotating force generated from a rotating power source.

In general, a conventional actuator uses a DC motor as a rotating power source, and the rotor output of the DC motor is torque-converted through a gear train in which a worm gear and a plurality of spur gears which are integrally formed in a rotor output end are gear-engaged to generate a high torque rotating output from an actuator output end.

Since the conventional electric actuator uses a DC motor with an external casing as a rotating power source, the magnet for position sensing of the rotor is not embedded in the casing, but attached separately to the outside and sensed using a Hall sensor, so the structure of connecting the Hall sensor from the PCB with the motor driving circuit is complicated.

If the actuator does not use a Hall sensor, only forward and reverse rotating motions are possible.

In general, the actuator has a low height of the housing as a whole product in use, and one of the horizontal and the vertical is configured to have a long shape. Accordingly, it is difficult to employ a structure in which a DC motor having an outer casing is vertically mounted on the inner bottom of the housing.

In the case of using a DC motor, the brake torque should be increased using a worm gear because the rotor should be held in a stationary position when external pressure is applied on the output shaft that rotates forward and reverse.

To use a worm gear and a worm wheel in a DC motor and to deliver power to the position where the output shaft is located, the connection therebetween is usually formed using a spur gear, in which case the following problems exist.

First, since the housing height of the actuator is low, there is a problem in that a DC motor is generally laid and applied, and thus an assembly structure is difficult and a unit cost is increased. That is, there is a problem in securing an assembly space due to the casing of the DC motor and the bearing that needs to hold the worm shaft.

Second, the structure of connecting the motor power in a controller becomes complicated.

Third, position information of the rotor is required for accurate position control in the actuator. To this end, since a position sensing magnet is placed at the bottom of a warm gear of a DC motor and a position sensing Hall sensor IC is applied, the structure of connecting a Hall sensor to a printed circuit board (PCB) is complicated to use DC power and to sense the position.

Fourth, in a gear train that uses multiple spur gears to obtain a large reduction ratio, the tolerance the rotating power of the drive motor increases, resulting in a large backlash and difficulty in controlling the precise position.

Korean Patent Application Publication No. 10-2017-0050869 (Patent Document 1) discloses an electric actuator using a direct-current (DC) motor, including: a power input unit including the DC motor; a planetary decelerator including a planetary gear for increasing torque by receiving a driving force from the power input unit and having an output shaft; an accelerator with a detachable cover that receives driving force from the planetary decelerator, increases the number of rotatings lowered in proportion to the increased torque, and opens one side; a screw shaft having a screw thread to convert the rotating motion transmitted from the accelerator into a linear motion; and a cylinder unit having a displacement nut screw-coupled to the screw shaft in a rotating manner to move forward and backward by rotating of the screw shaft.

As the electric actuator of Patent Document 1 uses a DC motor, precise position control is difficult, and assembly productivity is reduced by adopting the planetary decelerator for torque enhancement.

In general, when the size of the actuator is small, the size of the drive motor is small, and thus the output becomes small. In this case, in order to obtain a high torque output value at the output terminal of the actuator, the rpm of the motor should be large, and the reduction ratio should be large using multiple spur gears, resulting in an increase in noise.

Recently, a variable headlamp that may maximize the driver's night view in conjunction with the driver's steering direction has been proposed, and a motor equipped with a lead screw may be used as a swiveling actuator that implements the swivelling and leveling of the headlamp.

Korean Patent Application Publication No. 10-2018-0014304 (Patent Document 2) proposes a swivel actuator that may minimize operating noise and vibration generation and improve assembly and productivity by improving the assembly composition and coupling structure of the actuator that moves the vehicle headlamp.

Patent Document 2 employs a transfer screw that changes the rotating power of the motor into a straight line motion to move a ramp moving unit coupled to the transfer screw.

DISCLOSURE

Technical Problem

To solve the conventional problems, it is an objective of the present invention to provide a swivel actuator having a power transmission structure capable of minimizing backlash by a gear train changing structure in which a worm wheel and a worm gear are integrally formed at intervals on a power transmission shaft to minimize the number of coupling gears.

It is another objective of the present invention to provide a drive motor in which a BLDC motor is vertically assembled in the form of a core motor on the bottom of a housing, and a swivel actuator using the drive motor, to improve a problem of a conventional structure of using a DC motor laid inside a housing having a low height.

It is another objective of the present invention to provide a swivel actuator in which a BLDC motor is installed on the bottom of a housing and a gear train for reduction is installed at the top thereof so as to have a compact and slim structure compared to the conventional art in which a DC motor is installed outside a rotating table.

It is another objective of the present invention to provide a swivel actuator that transforms a gear train for reduction more compactly by installing a drive motor on the bottom of a housing and the gear train for reduction on the top thereof.

It is another objective of the present invention to provide a swivel actuator capable of reducing the size by optimally arranging, inside a housing, a gear train in which a small-sized drive motor, a worm wheel, and a worm gear are integrated with a power transmission shaft.

It is another objective of the present invention to provide a swivel actuator that may minimize backlash and suppress vibration generation by installing a BLDC-type drive motor on the bottom of a housing and placing, in a symmetrical structure inside the housing, first and second gear trains in which a worm wheel and a worm gear are integrally formed on the top thereof at intervals on a power transmission shaft.

Technical Solution

In order to achieve the above objective, according to an aspect of the present invention, there is provided a drive motor for a swivel actuator including: a cylindrical housing in which a hollow cylindrical portion protrudes from a bottom of a center thereof and a step portion protrudes from an inner side wall thereof; a rotor provided with a rotor support which is rotatably coupled to the outer circumference of the hollow cylindrical portion and has a lower end portion which is formed in a cup shape; first and second bearings arranged between the cup-shaped lower end of the rotor support and a lower end of the hollow cylindrical portion of the housing to rotatably support the rotor; and a stator arranged on the bottom of the housing to rotate the rotor by generating a rotating magnetic field while having an air gap on an outside of the rotor, wherein a first worm gear is integrally formed on an outer circumferential portion of an extension unit extending to an upper portion of the rotor support.

The housing includes: a cylindrical body case with open upper and lower portion and a step portion protruding inside; and a circular lower cover with an outer circumferential portion fixed to the lower end of the cylindrical body case and a hollow cylindrical portion protruding in the center thereof, wherein a gear train for reduction and a pinion gear unit may be installed at the top of the step portion, in separation from the drive motor placed on the lower side of the step portion.

The drive motor for a swivel actuator according to the present invention may further include a Hall sensor assembly disposed in an annular groove formed around the hollow cylindrical portion to detect a rotor position signal when the rotor rotates.

According to another aspect of the present invention, there is provided a swivel actuator including: a cylindrical housing in which a hollow cylindrical portion protrudes from a bottom of a center thereof and first and second step portions protrude from an inner side wall thereof; a drive motor which is arranged on a bottom surface of the housing and has a cylindrical first worm gear integrally formed on an outer circumference of a cylindrical extension unit extending to an upper portion of the rotor; first and second gear trains which are arranged on the upper portion of the second step portion, respectively, and in which second and third worm wheels gear-coupled to the outer circumference of the cylindrical first worm gear are formed on either one side of first and second power transmission shafts, and second and third worm gears are formed on the other sides of the first and second power transmission shafts; first and second pinion gear units in which fourth and fifth worm wheels gear-coupled to the second and third worm gears are formed at the lower ends of first and second support shafts, respectively, and first and second pinion gears are integrally formed on the upper ends of the first and second support shafts; and a rotating table configured to rotate in which the first and second pinion gears are gear-coupled to a ring gear integrally formed on the inner side of the side surface portion.

The second and third worm wheels may be gear-coupled to the opposite outer circumferences of the cylindrical first worm gear, and the first and second pinion gears may be gear-coupled to the opposite inner circumferences of the ring gear.

In addition, the first and second power transmission shafts may be installed in a horizontal direction orthogonal to the axis of the cylindrical first worm gear, and the first and second support shafts may be installed in a vertical direction orthogonal to the first and second power transmission shafts, respectively.

The swivel actuator according to the present invention may further include: first and second bearings arranged between the cup-shaped lower end of the rotor support and the lower end of the hollow cylindrical portion of the housing so as to rotatably support the rotor; and a third bearing for rotatably supporting the rotating table on an outer circumference of the hollow cylindrical portion.

According to another aspect of the present invention, there is provided a swivel actuator including: a cylindrical housing in which a hollow cylindrical portion protrudes from a bottom of a center thereof and first and second step portions protrude from an inner side wall thereof; a drive motor arranged on the bottom surface of the housing and providing rotational power to a rotor support extending upward; a cylindrical first worm gear integrally formed on the outer circumference of the rotor support; and first and second three-stage gear mechanisms coupled to opposite outer circumferences of the first worm gear, respectively, and rotating a rotating table with increased torque by reducing a rotation speed of the first worm gear, wherein the drive motor is arranged in a lower space of the second step portion, and the first and second three-stage gear mechanisms are installed on an upper surface of the second step portion.

Each of the first and second third gear mechanisms incudes: first and second gear trains which are arranged on the upper portion of the second step portion, respectively, and are coupled to the outer circumference of the first worm gear in which second and third worm wheels gear-coupled to the first worm gear are formed on one-side portions of first and second power transmission shafts, and second and third worm gears are formed on the other-side portions of the first and second power transmission shafts; first and second pinion gear units in which fourth and fifth worm wheels gear-coupled to the second and third worm gears are formed at the lower ends of first and second support shafts, respectively, and first and second pinion gears are integrally formed on the upper ends of the first and second support shafts; and a ring gear in which the first and second pinion gears of the first and second pinion gear units are integrally formed inside the side of the rotating table to be gear-coupled with each other.

The swivel actuator according to the present invention may further include an oil seal installed between the rotating table and the housing and having a lower portion supported by the first step portion of the housing.

In addition, the second and third worm wheels may be gear-coupled to the opposite outer circumferences of the cylindrical first worm gear, and the first and second pinion gears may be gear-coupled to the opposite inner circumferences of the ring gear.

Advantageous Effects

As described above, in the present invention, a worm wheel and a worm gear are integrally formed at intervals on a power transmission shaft to provide a power transmission structure capable of minimizing backlash by a gear train change structure in which the number of coupling gears is minimized. As a result, the present invention may reduce overall size and secure a space compared to a conventional gear train in which a plurality of spur gears are combined, thereby increasing degree of freedom in design and reducing costs.

Further, in the present invention, a BLDC motor of a vertical assembly structure is provided with a structure of assembling a core motor-shaped BLDC motor on the bottom of a housing, to improve the problem of the conventional structure of using a DC motor laid inside a low-height housing.

In addition, according to the present invention, there may be provided an internal hollow swivel actuator in which a BLDC motor is installed on the bottom of a housing to have a compact and slim structure and a gear train for reduction is installed at an upper portion thereof, thereby more compactly deforming the gear train for reduction, compared to a conventional technology in which a DC motor is installed outside a rotating table.

The present invention may provide an actuator whose size is miniaturized by optimally arranging a power transmission shaft inside a housing in which a worm wheel and a worm gear constituting a small drive motor and a gear train are integrally formed.

Moreover, according to the present invention, a BLDC drive motor is installed on the bottom of a housing, and first and second gear trains and first and second pinion gear units, in which a worm wheel and a worm gear are integrally formed at intervals on a power transmission shaft, are arranged in a symmetrical structure in the housing, thereby minimizing backlash and simultaneously suppressing vibration generation.

BEST MODE FOR CARRYING OUT THE INVENTION

Figure 1:
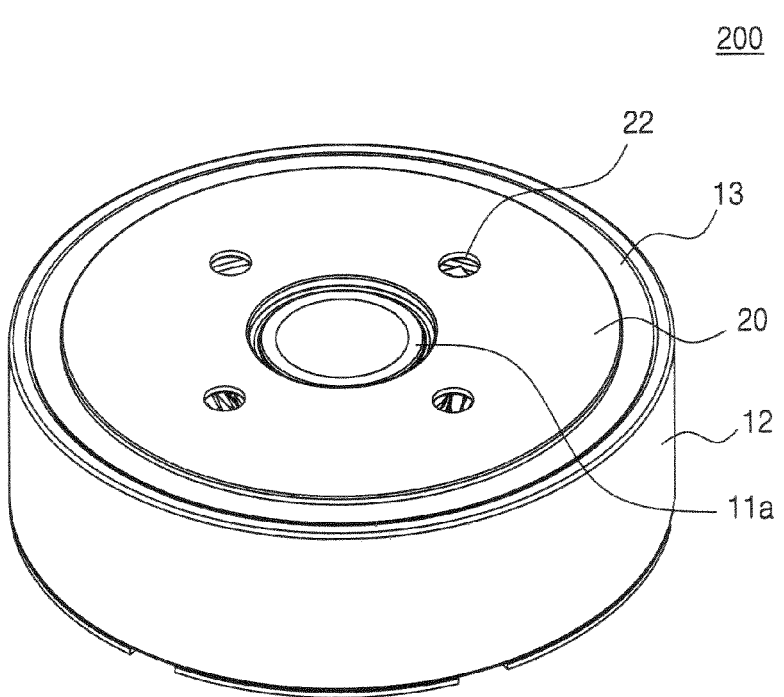
FIGS. 1 to 3 are a perspective view, a plan view, and a cross-sectional view taken along line A-A of FIG. 2, respectively, of an internal hollow swivel actuator according to a preferred embodiment of the present invention.
Figure 2:
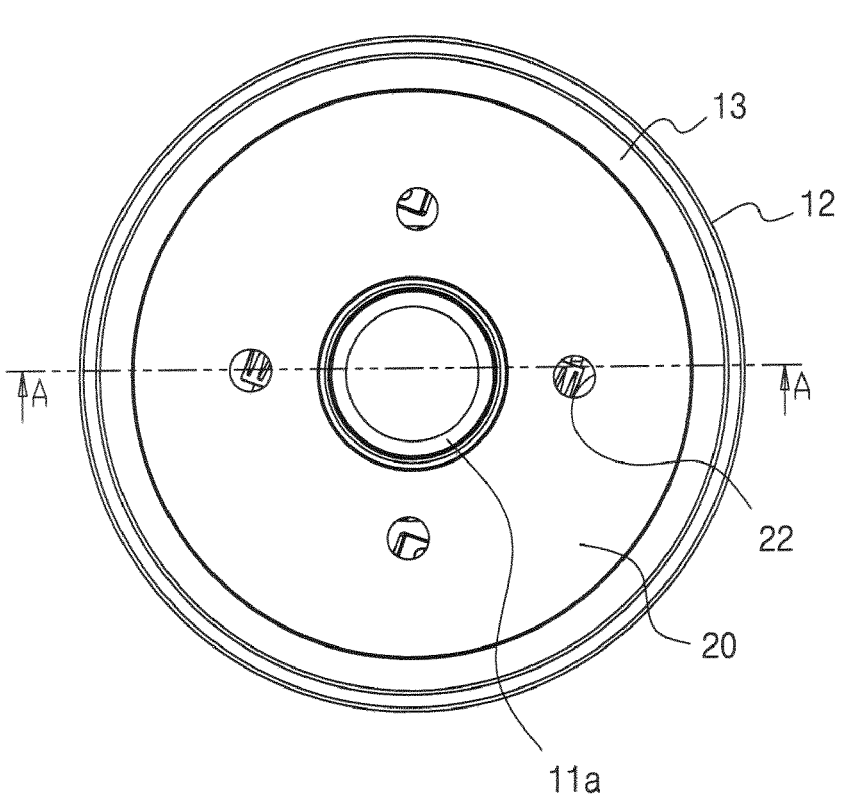
Figure 3:
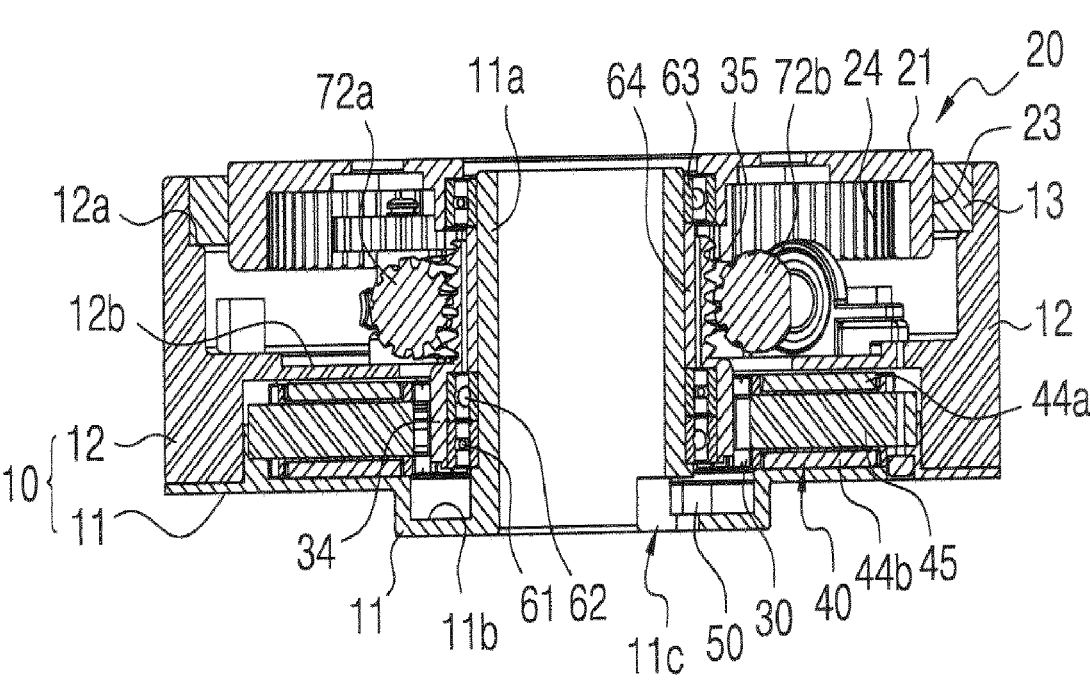
Figure 4:
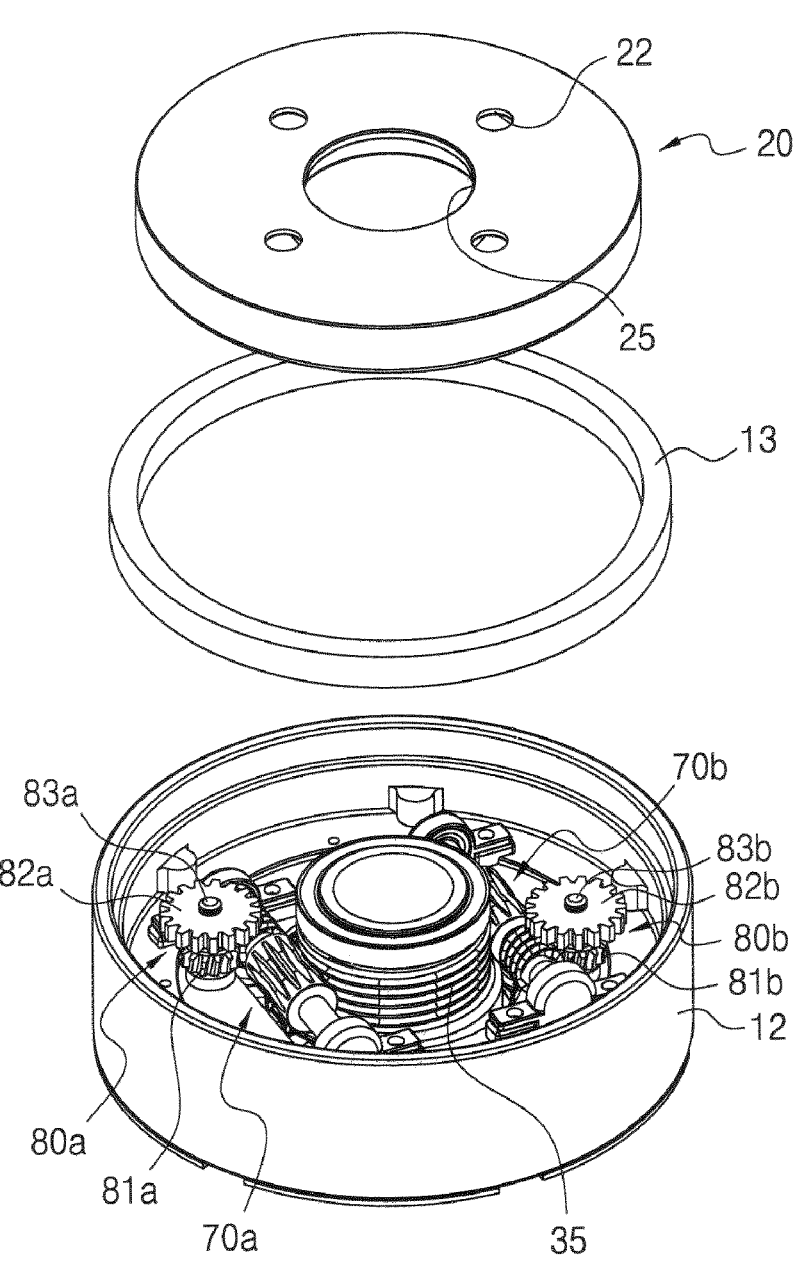
FIGS. 4 to 7 are an exploded perspective view of a rotating table of a swivel actuator according to a preferred embodiment of the present invention, a plan view of FIG. 4 in which the rotating table is removed, a cross-sectional view taken along line B-B of FIG. 5, and a cross-sectional view taken along line C-C of FIG. 5, respectively.
Figure 5:
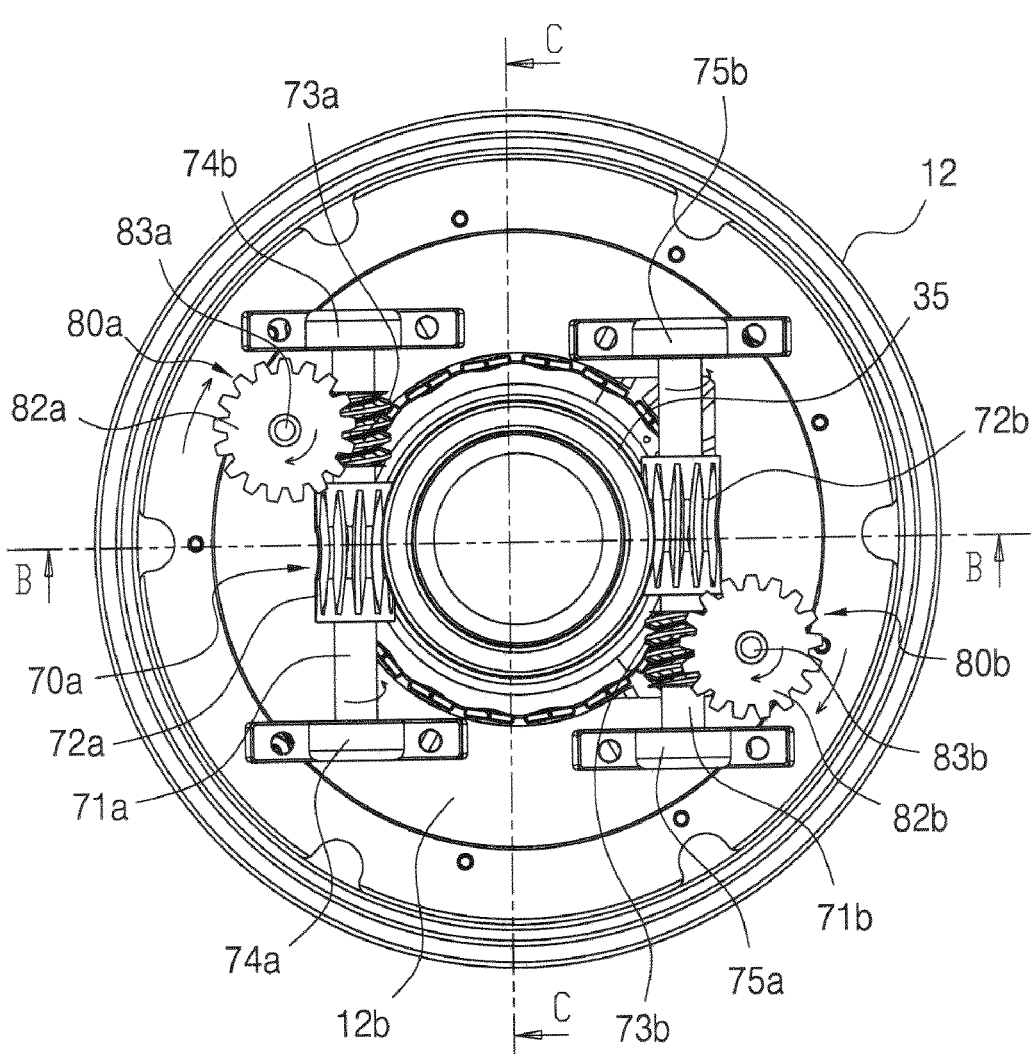
Figure 6:
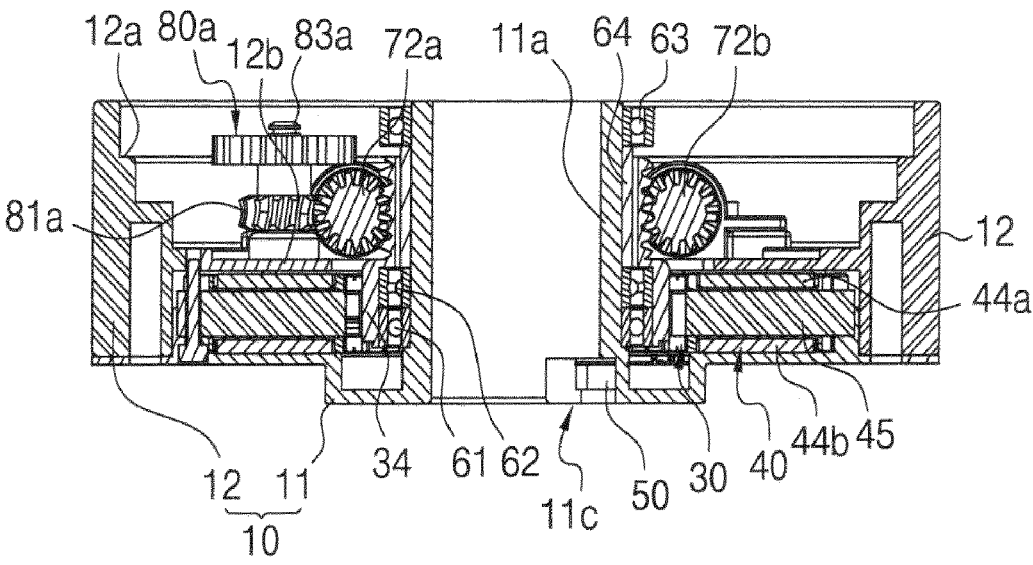
Figure 7:
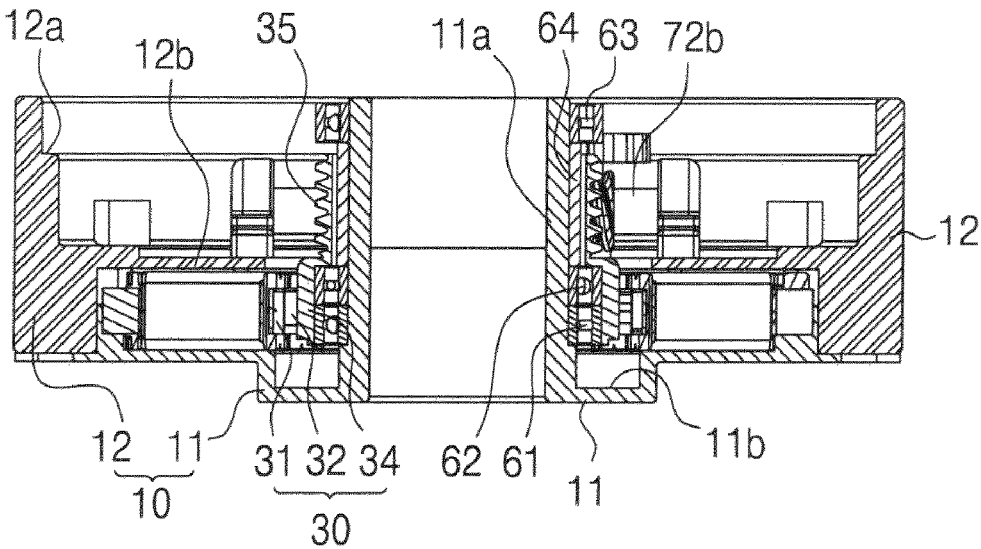
Figure 8:
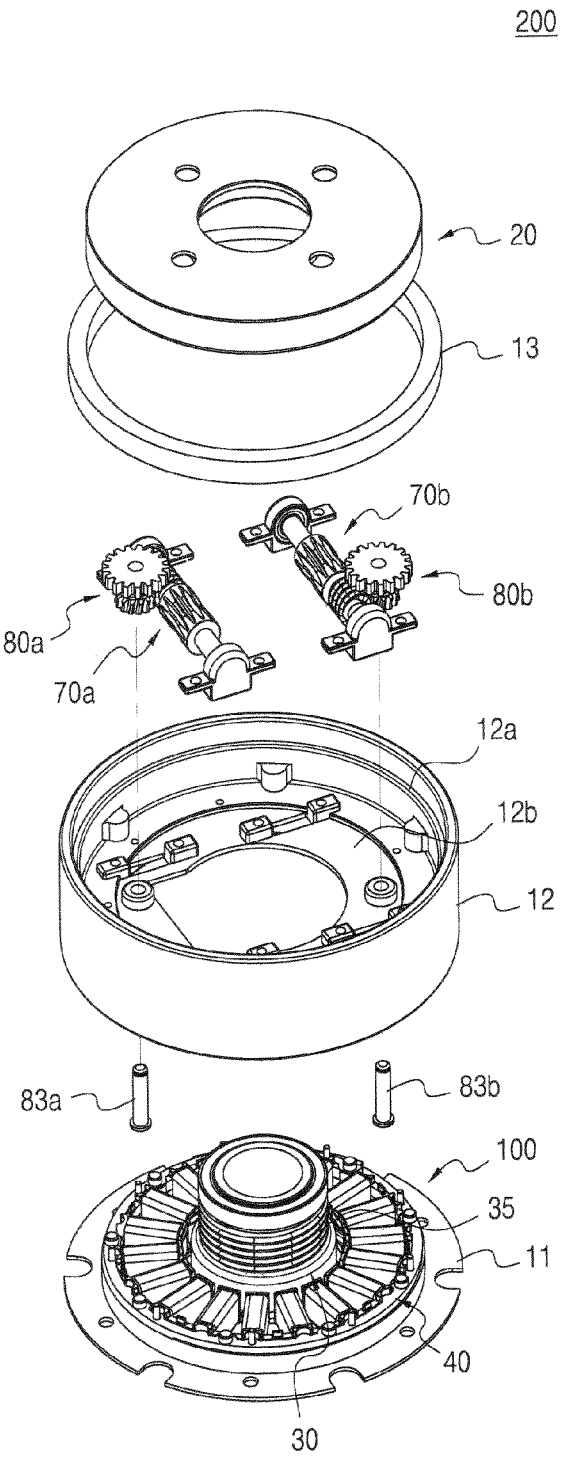
FIGS. 8 and 9 are a module—each exploded perspective view and a fully exploded perspective view of a swivel actuator according to a preferred embodiment of the present invention, respectively.

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

A swivel actuator according to the present invention is used for rotating a passive object main body together with a rotating table. In the following description, an inner hollow swivel actuator for driving a passive object by using a BLDC-type drive motor as a power source is described.

In general, it is difficult to apply a BLDC-type drive motor to an actuator with a disk-shaped housing structure, and in this invention, a drive motor is vertically erected in a lower portion of a housing and the size of the drive motor in a radial direction is increased to increase motor torque. The drive motor has a stator and a rotor arranged on the bottom surface of the housing, and uses an inner rotor type BLDC motor.

An actuator according to the conventional art includes a motor portion made of a DC motor, a gear part, and a rotating part, which are configured as separate components, so when assembling the actuator to a main body using an actuator product, there are many problems such as assembly tolerance and supply of parts. Meanwhile, an actuator according to the present invention includes a drive motor, a gear train, and a rotating body, which are integrally formed, to thereby achieve miniaturization and slimness while solving the problems of conventional technology.

In addition, the swivel actuator according to this invention includes a BLDC-type drive motor, a pair of gear trains that transmit the rotating power of the drive motor to a rotating table and increase torque by reduction, and the rotating table which is rotated by the outputs of the gear trains, wherein a passive object is coupled to the rotating table so that the passive object is rotated together with the rotating table. In this case, the drive motor, the gear train, and the rotating table may be integrally assembled to the housing.

In addition, the swivel actuator according to the present invention is formed in a disc shape, and includes a through-hole for withdrawing a cable, which is formed in a central portion thereof as an inner hollow shape, and a plurality of coupling holes, for example, three or four coupling holes, which are formed on an upper portion of a rotating body (a rotating table) so as to be connected to a passive object, in which a lower end portion of a fixing bolt passes through each of the coupling holes so as to be screw-coupled to and fixed to a stud nut fixedly installed on an inner surface of the rotating table.

The swivel actuator according to an embodiment of the present invention has an annular stator arranged on the bottom of the housing and a rotor arranged therein and having a worm gear integrally formed on the upper side thereof. A worm wheel of a power transmission shaft forming a gear train is gear-engaged with the worm gear of the rotor, a worm gear formed on the other end of the power transmission shaft is coupled to a worm wheel located at the lower end of a pinion gear unit, and a pinion gear located at the upper end of the pinion gear unit is coupled to a ring gear formed inside a lateral surface portion of a rotating table, so as to rotate the rotating table.

The inner hollow swivel actuator of this invention may minimize backlash and suppress vibration generation by installing a BLDC-type drive motor on the bottom of a housing and placing, in a symmetrical structure inside the housing, first and second gear trains in which a worm wheel and worm gear are integrally formed at intervals on a power transmission shaft.

Referring to FIGS. 1 to 7, the inner hollow swivel actuator 200 according to a preferred embodiment of the present invention includes: a cylindrical housing 10 in which a hollow cylindrical portion 11a protrudes at a center thereof and first and second step portions 12a and 12b protrude from an inner side wall thereof; a drive motor 100 which is arranged on a bottom surface of the housing 10 and has a first worm gear 35 integrally formed on an outer circumference of an extension unit extending to an upper portion of the rotor 30; first and second gear trains 70a and 70b which are arranged in opposition to each other on the upper portion of the second step portion 12b, respectively, and coupled to the outer circumference of the cylindrical first worm gear 35 in which second and third worm wheels 72a and 72b gear-coupled to the first worm gear 35 are respectively formed at one-side portions of first and second power transmission shafts 71a and 71b, and second and third worm gears 73a and 73b are respectively formed at the other sides of the first and second power transmission shafts 71a and 71b; first and second pinion gear units 80a and 80b in which fourth and fifth worm wheels 81a and 81b gear-coupled to the second and third worm gears 73a and 73b are formed at the lower ends of first and second support shafts, respectively, and first and second pinion gears 82a and 82b are integrally formed on the upper ends of the first and second support shafts, respectively; and a rotating table 20 configured to rotate in which the first and second pinion gears 82a and 82b of the first and second pinion gear units 80a and 80b are gear-coupled to a ring gear 24 integrally formed on the inner side of the side surface portion.

The housing 10 includes: a cylindrical body case 12 with upper and lower portions opened and two-stage first and second step portions 12a and 12b protruding inside; and a circular lower cover 11 with an outer circumference fixed to a lower end of the body case 12 and the hollow cylindrical portion 11a protruding from the center thereof.

The drive motor 100 includes: a rotor 30 rotatably coupled to an outer circumference of the hollow cylindrical portion 11a of the lower cover 11; and a stator 40 arranged at an outer side of the rotor 30 with an air gap therebetween and arranged on an upper surface of the lower cover 11 to rotate the rotor 30 by generating a rotating magnetic field, wherein the first worm gear 35 is integrally formed on an outer circumferential portion of the extension unit of a rotor support 34 extending to an upper portion of the rotor 30.

The rotor 30 includes a rotor support 34 with a cup-shaped lower end, a back yoke 32 and a magnet 31 located sequentially outside the lower end of the rotor support 34. For example, the magnet 31 is placed on the outer circumference of the back yoke and includes of split magnet pieces of a plurality of N and S poles, or a magnet with a plurality of N and S poles on a ring-shaped magnet may be used, and the back yoke 32 is installed on the back of the magnet 31 to form a magnetic circuit.

The rotor 30 is rotatably supported by the first and second bearings 61 and 62 installed between the inner circumference of the rotor support 34 in the form of a cup and the cylinder 11a.

The back yoke and the magnet are supported on an outer circumference of a lower end of the rotor support 34, and the first worm gear 35 is integrally formed on an outer circumference of an upper end thereof.

The stator 40 includes: a stator core 45 having the plurality of teeth 41 formed in a "T" shape and the back yoke 42 connected to the plurality of teeth 41 to form a magnetic circuit; the upper and lower insulators 44a and 44b of an insulating material assembled at the upper portion and the lower portion of the stator core 45 to surround the outer circumferential surface around which the coil 43 is wound in each of the plurality of teeth 41; and the coil 43 wound around the outer circumferential surfaces of the upper and lower insulators 44a and 44b.

In this case, the insulator 44a and 44b may be integrally formed as a bobbin and a stator support surrounding the back yoke 42 along with the plurality of teeth 41.

Figure 9:
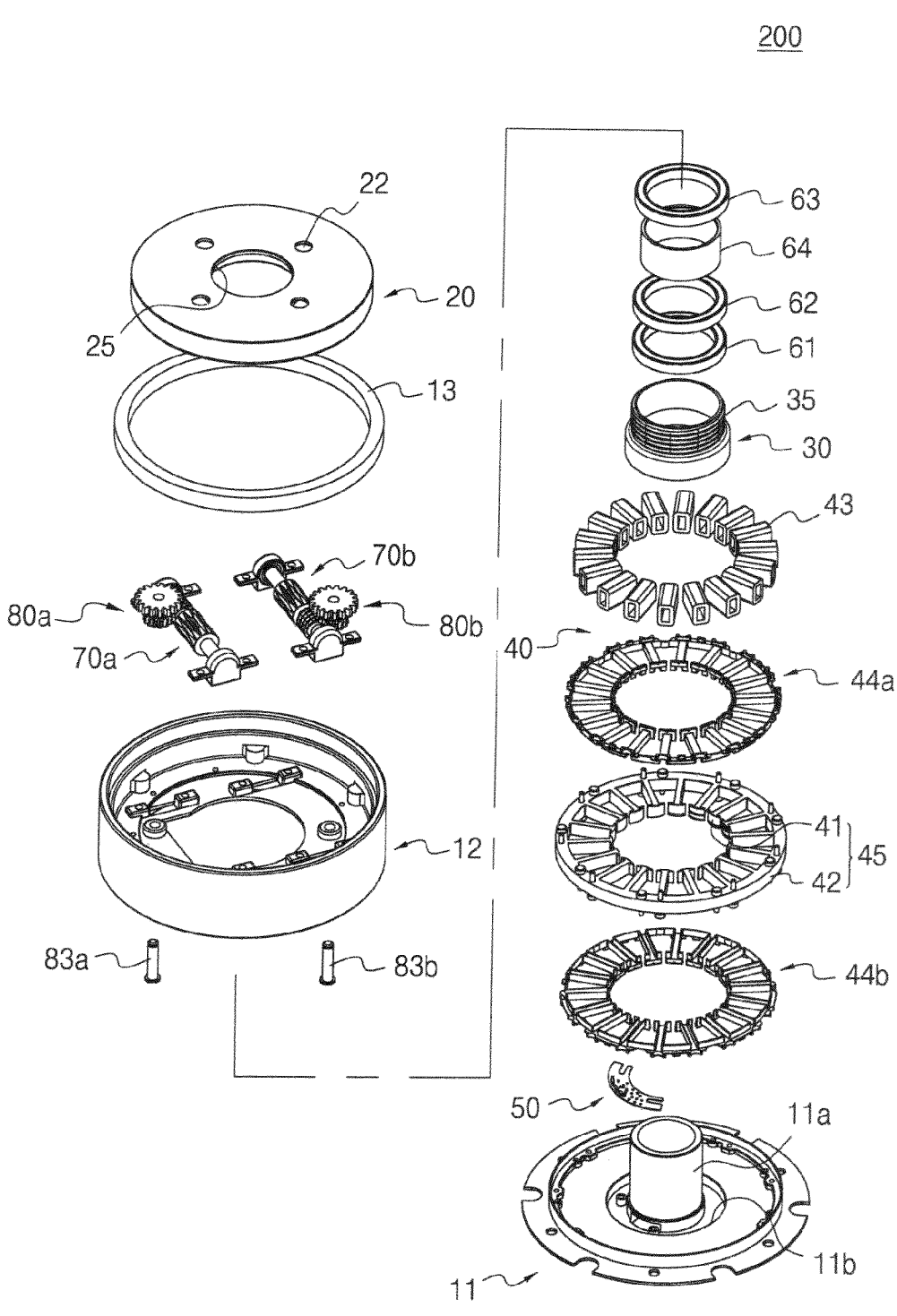
Figure 10:
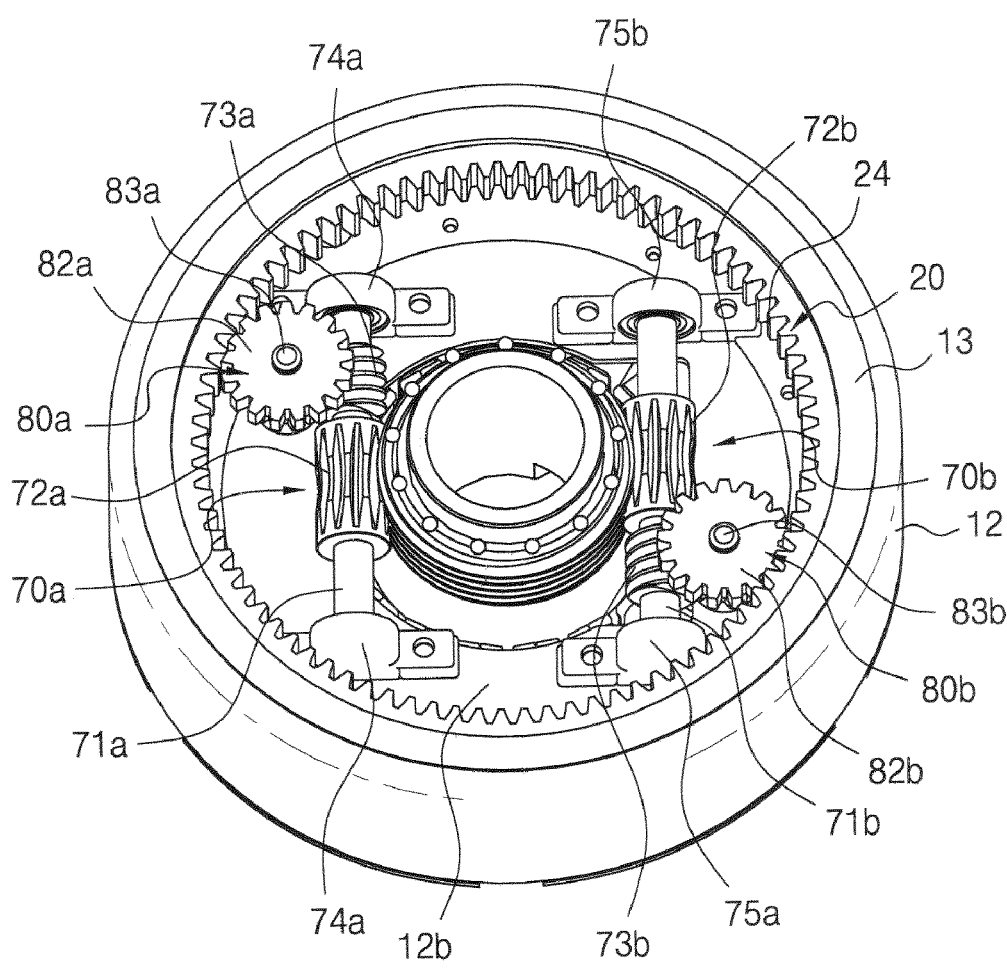
FIG. 10 is a perspective view showing a power transmission mechanism for driving a ring gear through a pair of power transmission shafts and a pair of pinions from a rotor of a drive motor according to a preferred embodiment of the present invention.

As shown in FIG. 9, an annular groove 11b is formed on the outer circumference of the hollow cylindrical portion 11a located in the center of the lower cover 11, and a Hall sensor assembly 50 is arranged in the annular groove 11b in which a plurality of Hall sensors installed close to the lower end of the rotor to detect rotor position signals when rotating the rotor are mounted on a printed circuit board.

The swivel actuator 200 according to this invention may include the BLDC motor with a 20 pole-18 slot structure, for example, as the drive motor 100. In addition, when the coil 43 of the stator 40 is wound on the plurality of teeth 41, the drive motor 100 may be configured to wind the coil 43 in a U, V, and W three-phase structure, and the other ends of the U, V, and W three-phase coils 43 may be connected in a star-connection method. Moreover, the drive motor 100 may be driven by a 6-step full-wave driving method using an inverter after receiving a rotor position signal from two or three Hall sensors, for example, in a motor driving circuit.

The first and second bearings 61 and 62 which rotatably support the rotor are installed between the rotor 30 and the hollow cylindrical portion 11a of the lower cover 11.

The swivel actuator 200 according to the present invention includes first and second three-stage gear mechanisms which are combined with the opposite outer circumference of the first worm gear 35 formed integrally with the outer circumference of the rotor support 34, and are configured to rotate the rotating table 20 at increased torque by slowing the rotational speed of the first worm gear 35.

The first and second three-stage gear mechanisms include a first gear coupling between the first worm gear 35 and the second and third worm wheels 72a and 72b, a second gear coupling between the second and third worm gears 73a and 73b, and fourth and fifth worm wheels 81a and 81b and a third gear coupling between the first and second pinion gears 82a and 82b and the ring gear 24.

The first and second gear couplings have a worm gear coupling structure, and the third gear coupling has an inscribed gear coupling structure.

The first and second gear trains 70a and 70b are arranged on the second step portion 12b to face each other around the hollow cylindrical portion 11a, respectively, and both ends of the first and second power transmission shafts 71a and 71b are rotatably supported by a pair of bearings 74a and 74b and a pair of bearings 75a, and 75b, respectively.

The second step portion 12b extends from the body case 12 to the center to support the first and second gear trains 70a and 70b and the first and second pinion gear units 80a and 80b separately from the drive motor 100 placed below.

The first and second gear trains 70a and 70b are coupled to the opposite outer circumferences of the first worm gear 35 respectively, and second and third worm wheels 72a and 72b gear-coupled to the first worm gear 35 are formed on one-side portions of the first and second transmission shafts 71a and 71b and second and third worm gears 73a and 73b are formed on the other-side portions of the first and second power transmission shafts 71a and 71b.

The first and second pinion gear units 80a and 80b are installed on the first and second support shafts 83a and 83b rotatably supported on a pair of bearings installed in the second step portion 12b, respectively, and fourth and fifth worm wheels 81a and 81b gear-coupled to the second and third worm gears 73a and 73b are formed at the lower ends thereof, respectively, and first and second pinion gears 82a and 82b are integrally formed at the upper ends thereof.

The rotating table 20 has the circular upper plate 21 and the side surface 23 extending downward from the outer circumference of the upper plate 21. A plurality of coupling holes 22 for coupling with the main body, which is a passive object installed on the rotating table 20, are penetratively formed in the upper plate 21, and a plurality of stud nuts engaged with fixed bolts are attached to the coupling holes 22 on the bottom surface of the upper plate 21.

A central through hole 25 through which a cable for connecting to a motor driving circuit installed outside the swivel actuator 200 passes from a stator coil 43 of the drive motor 100 and a plurality of Hall sensors provided in the Hall sensor assembly 50 is formed at the center of the upper plate 21. The cable is connected to the stator coil 43 and the Hall sensor assembly 50 through the central through hole 25 and the cylindrical portion 11a of the upper plate 21.

A through hole 11c communicating with the groove 11b of the lower cover 11 is formed at the lower end of the hollow cylindrical portion 11a, so that the cable may pass therethrough.

Moreover, the upper end of the hollow cylindrical portion 11a of the lower cover 11 is located in the central through hole 25, and a third bearing 63 is installed in the center of the lower surface of the upper plate 21 to rotatably support the rotating table 20 to the outer circumference of the hollow cylindrical portion 11a.

Moreover, a ring-shaped stopper 64 is inserted between the third bearing 63 and the second bearing 62 installed on the outer circumference of the hollow cylindrical portion 11a, to set the relative positions of the third bearing 63 and the second bearing 62.

A ring gear 24 is integrally formed inside the side surface portion 23 of the rotating table 20, and first and second pinion gears 82a and 82b of the first and second pinion gear units 80a and 80b are gear-coupled to two opposite points of the ring gear 24.

In addition, a ring-shaped oil seal 13 is inserted between the rotating table 20 and the body case 12 to prevent internal oil from leaking, and the lower portion thereof is supported by the first step portion 12a.

In the swivel actuator 200, the first and second power transmission shafts 71a and 71b may be installed in a horizontal direction orthogonal to the axis of the cylindrical first worm gear 35, and the first and second support shafts 83a and 83b may be installed in a vertical direction orthogonal to the first and second power transmission shafts 71a and 71b, respectively.

Hereinafter, an operation of the inner hollow swivel actuator 200 according to the present invention will be described with reference to FIGS. 1 to 10.

In the internal hollow swivel actuator 200 of the present invention, first, when the stator 40 of the BLDC drive motor 100 installed on the bottom of the housing 10 is operated, the rotor 30 rotates clockwise by the rotating magnetic field, and the first worm gear 35 formed integrally on the upper side of the rotor support 34 also rotates clockwise.

When the first worm gear 35 rotates clockwise, the second and third worm wheels 72a and 72b of the first and second gear trains 70a and 70b gear-coupled to the first worm gear 35 rotate counterclockwise, and the first and second power transmission shafts 71a and 71b also rotate counterclockwise.

As a result, the second and third worm gears 73a and 73b formed on the other-side portions of the first and second power transmission shafts 71a and 71b rotate the fourth and fifth worm wheels 81a and 81b located at the lower ends of the first and second support shafts 83a and 83b of the first and second pinion gear units 80a and 80b to be gear-coupled.

Accordingly, the first and second pinion gears 82a and 82b located at the top ends of the first and second support shafts 83a and 83b are rotated clockwise, respectively, and the first and second pinion gears 82a and 82b are gear-coupled with the opposite two points of the ring gear 24 provided in the rotating table 20 to rotate the rotating table 20 in the same clockwise direction.

The swivel actuator 200 according to the present invention includes first and second three-stage gear mechanisms arranged in a symmetrical structure around the axis of the cylindrical first worm gear 35.

The first and second three-stage gear mechanisms include first to third gear couplings, respectively, and are designed to be speed-reduced for each gear coupling. In this case, the total speed reduction ratio may be determined as a product of the speed reduction ratio of each of the first to third gear couplings.

First and second three-stage gear mechanisms according to the present invention may include a first gear coupling between the first worm gear 35 and the second and third worm wheels 72a and 72b, a second gear coupling between the second and third worm gears 73a and 73b, and fourth and fifth worm wheels 81a and 81b and a third gear coupling between the first and second pinion gears 82a and 82b and the ring gear 24.

When speed reduction ratios of the first gear coupling, the second gear coupling, and the third gear coupling are set to be, for example, 9:1 and 7.777:1, and 5:1, respectively, The total reduction ratio of the rotational speed transmitted from the first worm gear 35 of the rotor 30 to the ring gear 24 of the rotating table 20 via the first and second gear trains 70a and 70b and the first and second pinion gear units 80a and 80b may be determined as 400:1.

The total reduction ratio of the swivel actuator according to this invention may be determined by adjusting the reduction ratio of each of the three-stage gear couplings in consideration of a torque value of the drive motor 100 and a desired output torque value of the swivel actuator.

In the present invention, when the BLDC drive motor 100 is rotated at, for example, 800 rpm, the reduction ratio is reduced to 400:1 through the first and second gear trains 70a and 70b and the first and second pinion gear units 80a and 80b, and the rotating table 20 rotates by lowering the rotation speed to 2 rpm. As a result, a passive object installed in the rotating table 20 is subjected to a large torque increase, so that smooth rotation may be performed.

In addition, the gear couplings of this invention include a two-stage gear mechanism including a worm gear and a worm wheel, respectively, so that a high reduction ratio and quiet and smooth operation may be achieved.

As described above, in the present invention, the first and second gear trains 70*a* and 70*b* are arranged in a symmetrical structure inside the housing 10, thereby minimizing backlash and suppressing generation of vibration.

That is, in the present invention, the first and second gear trains 70*a* and 70*b* may be configured so that second and third worm wheels 72*a* and 72*b* gear-coupled to the first worm gear 35 are formed on one-side portions of first and second power transmission shafts 71*a* and 71*b*, respectively, second and third worm gears 73*a* and 73*b* are integrally formed on the other-side portions of the first and second power transmission shafts 71*a* and 71*b*, respectively, and the second and third worm gears 73*a* and 73*b* are gear-coupled to the fourth and fifth worm wheels 81*a* and 81*b* of the first and second pinion gear units 80*a* and 80*b*, respectively. As a result, the first and second pinion gears 82*a* and 82*b* located at the top ends of the first and second pinion gear units 80*a* and 80*b* rotate the ring gear 24 provided in the rotating table 20 in the same direction.

Therefore, in this invention, by a power transmission structure that symmetrically transmits the rotational power of the drive motor 100 to two opposite points of the ring gear 24 provided in the rotating table 20 using the first and second gear trains 70*a* and 70*b* and the first and second pinion gear units 80*a* and 80*b*, it is possible to minimize the backlash and suppress the occurrence of vibration.

As described above, in the present invention, by using the first and second power transmission shafts 71*a* and 71*b* in which second and third worm wheels 72*a* and 72*b* and second and third worm gears 73*a* and 73*b*, which are integrally formed at intervals, a power transmission structure capable of minimizing backlash may be achieved by a gear train structure that minimizes the number of coupled gears.

In addition, the present invention is provided with an output worm gear of a multiple thread screw as a gear train to prevent a reduction gear ratio from increasing while lowering the rpm of a drive motor 100, which is a factor of noise increase.

Furthermore, the present invention may provide an actuator whose size is miniaturized by optimally arranging a power transmission shaft inside a housing in which a worm wheel and a worm gear constituting a small drive motor and a gear train are integrally formed.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The swivel actuator according to the present invention may be applied for rotating, together with a rotating table, a passive object installed in the rotating table.

What is claimed is:

1. A drive motor for a swivel actuator comprising:
a cylindrical housing in which a hollow cylindrical portion protrudes from a bottom of a center thereof and a step portion protrudes from an inner side wall thereof;
a rotor provided with a rotor support which is rotatably coupled to the outer circumference of the hollow cylindrical portion and has a lower end portion which is formed in a cup shape;

12 first and second bearings arranged between the cup-shaped lower end of the rotor support and a lower end of the hollow cylindrical portion of the housing to rotatably support the rotor; and
a stator arranged on the bottom of the housing to rotate the rotor by generating a rotating magnetic field while having an air gap on an outside of the rotor,
wherein a first worm gear is integrally formed on an outer circumferential portion of an extension unit extending to an upper portion of the rotor support, and
wherein the housing comprises:
a cylindrical body case having open upper and lower portions and a step portion protruding inside; and
a circular lower cover having an outer circumferential portion fixed to a lower end of the body case and a hollow cylindrical portion protruding from a center thereof, and
a gear train for reduction and a pinion gear unit are installed on an upper side of the step portion in separation from the drive motor arranged on a lower side of the step portion.

2. The drive motor for a swivel actuator of claim 1, further comprising a Hall sensor assembly arranged in an annular groove formed around the hollow cylindrical portion to detect a rotor position signal when the rotor rotates.

3. A swivel actuator comprising:
a cylindrical housing in which a hollow cylindrical portion protrudes from a bottom of a center thereof and first and second step portions protrude from an inner side wall thereof;
a drive motor which is arranged on a bottom surface of the housing and has a cylindrical first worm gear integrally formed on an outer circumference of a cylindrical extension unit extending to an upper portion of the rotor;
first and second gear trains which are arranged on the upper portion of the second step portion, respectively, and in which second and third worm wheels gear-coupled to the outer circumference of the cylindrical first worm gear are formed on either one side of first and second power transmission shafts, and second and third worm gears are formed on the other sides of the first and second power transmission shafts;
first and second pinion gear units in which fourth and fifth worm wheels gear-coupled to the second and third worm gears are formed at the lower ends of first and second support shafts, respectively, and first and second pinion gears are integrally formed on the upper ends of the first and second support shafts; and
a rotating table configured to rotate in which the first and second pinion gears are gear-coupled to a ring gear integrally formed on the inner side of the side surface portion.

4. The swivel actuator of claim 3, wherein the second and third worm wheels are gear-coupled to the opposite outer circumferences of the cylindrical first worm gear, and the first and second pinion gears are gear-coupled to the opposite inner circumferences of the ring gear.

5. The swivel actuator of claim 3, wherein the first and second power transmission shafts are installed in a horizontal direction orthogonal to the axis of the cylindrical first worm gear, and the first and second support shafts are installed in a vertical direction orthogonal to the first and second power transmission shafts, respectively.

6. The swivel actuator of claim 3, further comprising:
first and second bearings arranged between the cup-shaped lower end of the rotor support and a lower end of the hollow cylindrical portion of the housing to rotatably support the rotor; and a third bearing rotatably supporting the rotating table on the outer circumference of the hollow cylindrical portion.

7. A swivel actuator comprising:

a cylindrical housing in which a hollow cylindrical portion protrudes from a bottom of a center thereof and first and second step portions protrude from an inner side wall thereof;

a drive motor arranged on the bottom surface of the housing and providing rotational power to a rotor support extending upward;

a cylindrical first worm gear integrally formed on the outer circumference of the rotor support; and first and second three-stage gear mechanisms coupled to opposite outer circumferences of the first worm gear, respectively, and rotating a rotating table with increased torque by reducing a rotation speed of the first worm gear, wherein the drive motor is arranged in a lower space of the second step portion, and the first and second three-stage gear mechanisms are installed on an upper surface of the second step portion.

8. The swivel actuator of claim 7, wherein each of the first and second third gear mechanisms comprises:

first and second gear trains which are arranged on the upper portion of the second step portion, respectively, and are coupled to the outer circumference of the first worm gear in which second and third worm wheels gear-coupled to the first worm gear are respectively formed on either one side of first and second power transmission shafts, and second and third worm gears are respectively formed on the other sides of the first and second power transmission shafts;

first and second pinion gear units in which fourth and fifth worm wheels gear-coupled to the second and third worm gears are formed at the lower ends of first and second support shafts, respectively, and first and second pinion gears are integrally formed on the upper ends of the first and second support shafts, respectively; and a ring gear in which the first and second pinion gears of the first and second pinion gear units are integrally formed inside the side of the rotating table to be gear-coupled with each other.

9. The swivel actuator of claim 7, wherein an oil seal provided between the rotating table and the housing and having a lower portion supported by the first step portion of the housing.

10. The swivel actuator of claim 8, wherein the second and third worm wheels are gear-coupled to the opposite outer circumferences of the cylindrical first worm gear, and the first and second pinion gears are gear-coupled to the opposite inner circumferences of the ring gear.

* * * * *